(12) United States Patent  
Khatri (10) Patent No.: US 7,114,347 B2  
(45) Date of Patent: Oct. 3, 2006

(54) CLOSED CYCLE REFRIGERATION SYSTEM AND MIXED COMPONENT REFRIGERANT

(76) Inventor: Ajay Khatri, 1006 Granite Dr., Bethlehem, PA (US) 18017

( * ) Notice: Subject to any disclaimer, the term of this patent is extended or adjusted under 35 U.S.C. 154(b) by 434 days.

(21) Appl. No.: 10/694,699

(22) Filed: Oct. 28, 2003

(65) Prior Publication Data

US 2005/0086950 A1   Apr. 28, 2005

(51) Int. Cl.  
*F25B 43/02* (2006.01)

(52) U.S. Cl. .......................................... 62/470; 62/513
(58) Field of Classification Search ................ 62/470, 62/475, 513
See application file for complete search history.

(56) References Cited

U.S. PATENT DOCUMENTS

| | | | |
|---|---|---|---|
| 3,204,422 A | 9/1965 | Buller et al. | |
| 3,413,819 A | 12/1968 | Hansen | |
| 3,698,202 A | 10/1972 | Missimer | |
| 3,768,273 A | 10/1973 | Missimer | |
| 4,718,251 A | 1/1988 | Thornton | |
| 5,167,126 A * | 12/1992 | Cartwright | 62/129 |
| 5,337,572 A | 8/1994 | Longsworth | |
| 5,441,658 A | 8/1995 | Boyarsky et al. | |
| 5,579,654 A | 12/1996 | Longsworth et al. | |
| 5,599,065 A | 2/1997 | Gryp et al. | |
| 5,687,574 A | 11/1997 | Longsworth et al. | |
| 5,706,663 A | 1/1998 | Boiarski et al. | |
| 5,729,993 A | 3/1998 | Boiarski et al. | |
| 6,041,621 A | 3/2000 | Olszewski et al. | |
| 6,502,410 B1 | 1/2003 | Podtchereniaev et al. | |

FOREIGN PATENT DOCUMENTS

| | | |
|---|---|---|
| GB | 1 336 892 | 11/1973 |
| SU | 627154 | 8/1978 |
| SU | 918298 | 7/1982 |
| SU | 1054400 A | 11/1983 |
| SU | 1089099 A | 4/1984 |

* cited by examiner

Primary Examiner—William E. Tapolcai (57) ABSTRACT

A closed cycle refrigeration system in conjunction with specific mixed or multiple component refrigerant fluids to produce temperatures in the range of 230° K to 70° K. The mixed component refrigerant can be blended from flammable or a non-flammable fluid components based upon the arrangement of the refrigeration equipment and the overall performance requirements for the system. A compressor, an after cooler, an oil separator, filter/dryer, heat exchanger, a throttle device with fixed orifice and an evaporator are arranged in a manner to improve system performance with refrigeration of the present invention or prior art refrigerants. Replaceable additional modules for oil filtration and moisture filtration can be part of the system.

7 Claims, 4 Drawing Sheets

CLOSED CYCLE REFRIGERATION SYSTEM AND MIXED COMPONENT REFRIGERANT

BACKGROUND OF THE INVENTION

Generally, refrigeration cycles, including closed cycle refrigeration systems are well known in the art. In a typical closed cycle refrigeration system intended for household or commercial applications, the system consists of a compressor that compresses the refrigerant, which is then cooled in a condenser, then expanded through an expansion device to produce cold refrigerant which is passed through an evaporator to provide cooling effect to the device or medium to be cooled and then the warmed refrigerant is returned to the compressor.

However, when the temperatures to be achieved are in the semi-cryogenic (230° K to 120° K) or cryogenic range (below 120° K), then efficient and reliable systems are hard to find. This problem is especially critical when temperatures below 120° K, e.g. close to liquid nitrogen condensation/boiling temperature (77° K), are to be achieved. To produce refrigeration at these temperatures a refrigeration system must use very high pressure refrigerant gases such as nitrogen, argon or methane. This in turn requires more expensive equipment and frequent maintenance.

A closed cycle refrigeration system utilized to provide relatively low temperatures, for example significantly below about 230° K, in the cryogenic range, for example about 70° K, encounters certain problems in providing an efficient system. This is due to the fact that the system is expected to operate efficiently first, from ambient temperatures (about 300° K) during cooldown and then, at steady state conditions at temperatures in the range of from about 230° K down to the range of about 70° K. It is known to use a large orifice during the initial cooldown to allow a large mass flow, followed by reducing the size of the orifice opening during steady state operation at low temperatures. Both manually adjusted and automatically adjusted orifices have been used to accomplish the goal of varying the size of the opening in a throttle device.

U.S. Pat. No. 5,595,065 (the specification of which is incorporated herein by reference) discloses both the older manual adjustment of the orifice opening and means for automatic adjustment of the orifice opening during the cooldown from ambient temperature to steady state operation in the cryogenic range.

Prior art systems of the type discussed in the '065 patent, tend to generate, during cooldown from ambient temperatures, from about 40% up to almost 60% of the peak refrigeration capacity obtained at steady state operation at temperatures below 230° K down to about 70° K. Typically, such prior art systems are designed so that the refrigeration flow, and hence the capacity, is low at the start of the cooldown compared to the flow and refrigeration capacity during steady state operation at temperatures below about 230° K.

It has also been suggested in the prior art to use mixed refrigerant systems to achieve temperatures in the semi-cryogenic range by employing cascade refrigeration systems with successive phase separators to permit use of a single compressor, such as described in U.S. Pat. No. 3,768,273. This type system is not practical, however, for small refrigeration systems where heat exchangers and cold heads are to be close to or need to be integrated with the system interface to be cooled.

In another method described in U.S. Pat. No. 5,337,572 an oil lubricated rolling piston compressor is shown to be suitable for use in a single stage compressor system without using phase separators or cascade heat exchangers. Patentee describes a flammable mixed component refrigerant fluid for a system providing temperatures below 150° K.

A system using flammable mixed component refrigerant fluid to reach cryogenic temperature is also discussed in British Patent No. 1,336,892.

Neither U.S. Pat. No. 5,337,572 or British Patent No. 1,336,892 teach or suggest a system or how to design a system that provides efficient long term operation, due to the problems associated with oil circulating with the mixed component refrigerant and the water vapor that the system desorbs during such long term operation. There is no teaching by patentees or guidance as to what characteristics the fixed orifice throttle device must have to provide efficient cooling from room temperature to temperatures below about 230° K. Neither reference provides sufficient refrigeration performance by a system that will allow the device interface to cool down when the starting heat load is higher than that which the system generates at room temperature. Under these conditions a larger system will be required, thus increasing the cost of the equipment and operating costs, a significant problem in actual applications. Neither patent teaches or suggests how to utilize non-flammable mixed component refrigerant fluids in such systems.

Mixed component refrigerant fluids of the prior art require a variable restrictor device to achieve cooldown from room temperature. This in turn requires the restrictor to be set at one level for cooldown and another level for steady-state operation. This complicates the system mechanically and complicates operation. Another method of achieving higher refrigeration in prior art systems deals with modifying mixed component refrigerant fluid components such that the density ratio of the refrigerant is manipulated to achieve better flow. Thus additional refrigerant components must be added to a mixed refrigerant fluid which do not add to a refrigeration effect. The problem related to cooldown from ambient is not fully recognized and addressed in the prior art. Remedies suggested prior to the present invention end up complicating system hardware, its method of operation and/or the composition of the mixed component refrigerant.

BRIEF SUMMARY OF THE INVENTION

The present invention pertains to an improved closed cycle refrigeration system wherein a specific arrangement of components of the system as well as mixed component refrigerants are features of the invention.

In one aspect the present invention is a closed cycle refrigeration system to produce temperatures in the range of from about 70 to about 230° K comprising in combination; a refrigerant consisting of at least two components, with each component selected from any one of the groups consisting of atmospheric gases, normally gaseous and liquid fluorocarbons, normally gaseous and liquid hydrofluorocarbons, and normally gaseous and liquid hydrocarbons, an oil lubricated compressor to pressurize the refrigerant, an after cooler to receive and cool the high pressure refrigerant, an oil separator to receive the refrigerant and remove oil from the refrigerant so as to produce a refrigerant containing less than 1% by weight lubricating oil in the refrigerant, a filter/dryer to receive the refrigerant from the oil separator and remove water from the refrigerant, a heat exchanger to receive the refrigerant from the filter/dryer and cool the refrigerant by heat exchange with a low pressure low temperature refrigerant return stream, a fixed orifice throttle device to receive the high pressure refrigerant stream from the heat exchanger and expand the high pressure refrigerant to produce a low pressure low temperature refrigerant stream, the throttle device so constructed and arranged to provide during cooldown of the refrigerant from normal ambient temperature more than about 60% of the maximum refrigeration capacity of the system available during desired steady state operation of the system, resulting in a low pressure low temperature refrigerant, means for utilizing the low pressure low temperature refrigerant stream to provide cooling, and means for returning a warmed low pressure refrigerant stream to the oil lubricated compressor.

In another aspect the present invention is a closed cycle refrigeration system for providing cooling temperatures from about 70° K to 230° K comprising in combination; an oil lubricated compressor for creating a high pressure refrigerant stream, an after cooler connected to an outlet of the compressor to further cool the high pressure refrigerant stream, an oil separator connected to an outlet of the after cooler, the oil separator adapted remove residual oil from the high pressure refrigerant stream so that the high pressure stream exiting the oil separator contains less than 1% by weight retained oil, means connected to the oil separator to extract water from the high pressure refrigerant stream, a heat exchanger connected to the means to extract moisture for further cooling the high pressure refrigerant stream against a returning low pressure refrigerant stream; expansion means connected to the heat exchanger to reduce the pressure of the refrigerant stream to produce a low pressure low temperature refrigerant stream, means to utilize the low pressure low temperature refrigerant stream to provide cooling, and means to return the low pressure refrigerant to a low pressure inlet side of the compressor.

In yet another aspect the present invention is a method for improving a closed cycle refrigeration system used to produce temperatures in the range of from about 70 to about 230° K the refrigeration system having an oil lubricated compressor to produce high pressure high temperature refrigerant, an oil separator to remove oil from the refrigerant an after cooler to reduce the temperature of the high temperature high pressure refrigerant, a filter/dryer to remove water from the refrigerant, a heat exchanger wherein the high temperature high pressure refrigerant is cooled by heat exchange with a low pressure low temperature refrigerant, a throttle device to expand the high pressure refrigerant and produce a low pressure cold refrigerant at a point of use, and means for returning the low pressure refrigerant to the oil lubricated compressor comprising the steps of placing the after cooler immediately downstream of a high pressure outlet of the compressor and before the oil separator, the oil separator having less than 7 psig pressure drop, preferably less than 3 psig pressure drop, between an inlet and an outlet and an oil carryover rate less than 0.001 grams/hour.

In still another aspect the present invention is a multiple component refrigerant comprising at least two components, with each component selected from one of the groups consisting of: (a) inert atmospheric gases; (b) normally gaseous and liquid flurocarbons; (c) normally gaseous and liquid hydrofluorocarbons; and (d) normally gaseous and liquid hydrocarbons.

DETAILED DESCRIPTION OF THE INVENTION

Figure 1:
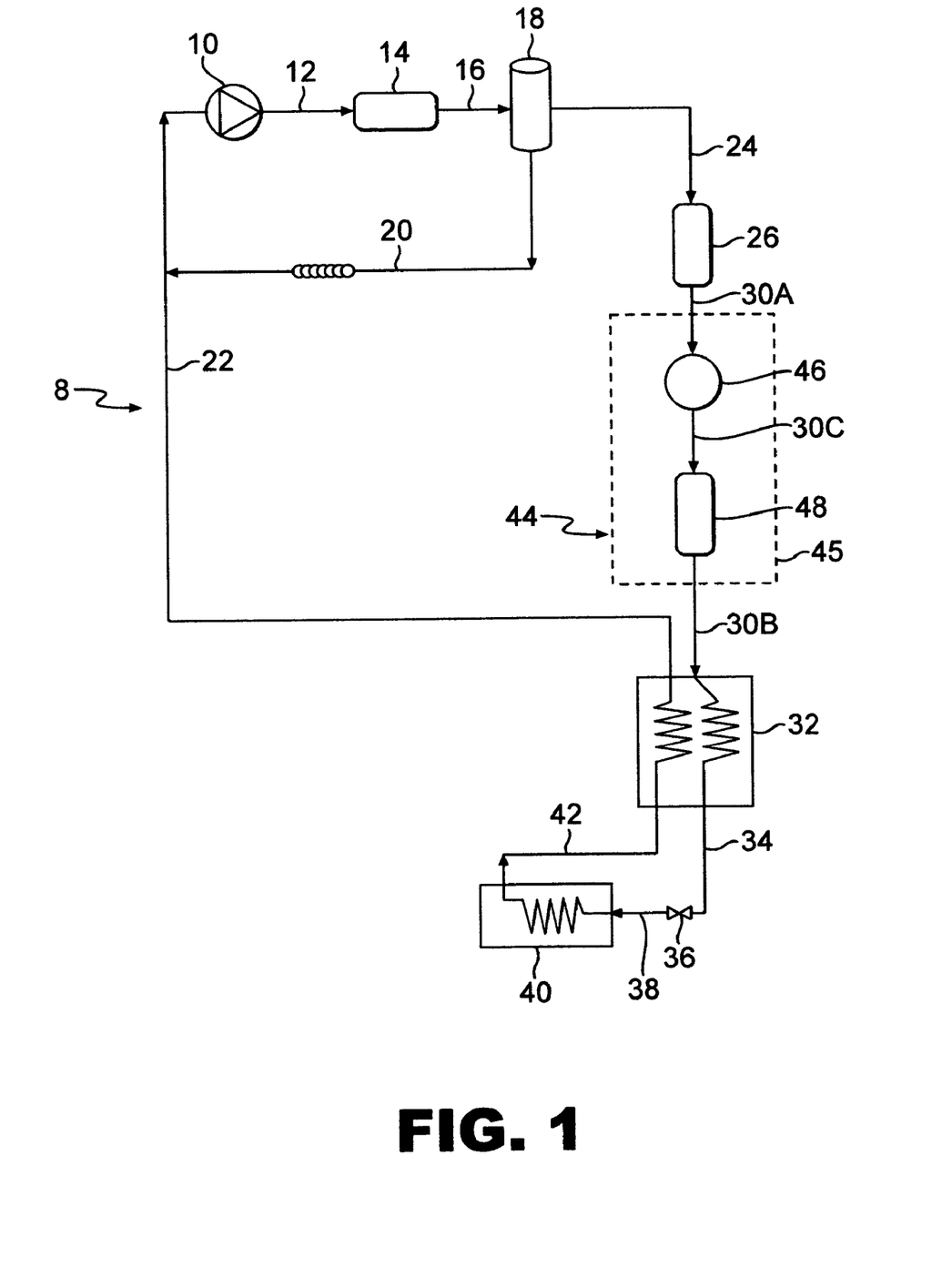
FIG. 1 is a schematic flow diagram illustrating a closed cycle refrigeration system according to the present invention.

Referring to FIG. 1 there is shown a closed cycle refrigeration system 8 consisting of an oil lubricated compressor 10 for compressing a refrigerant to produce a high pressure, high temperature refrigerant fluid, which is passed by means of line 12 to after-cooler 14 to remove heat of compression and produce a partially cooled high pressure, refrigerant stream. After-cooler 14 can use either water or air as the cooling medium. The placement of after-cooler 14 immediately downstream of the compressor 12 is a feature of the invention. The cooled, high pressure refrigerant stream exiting after-cooler 14 is passed by means of line 16 to oil separator 18 wherein oil picked up by the refrigerant in compressor 10 is removed from the refrigerant, with the oil separated from the refrigerant stream passed by means of line 20 to refrigerant return line 22 for return to the inlet of compressor 10. A preferred oil separator is manufactured by Kaydon Corporation of LaGrange Ga. 30240. In a preferred embodiment of the invention the oil filter is oriented in a vertical position and features an internal glass medium-wrap oil separator cartridge with an internal support tube. The refrigerant stream enters through an inlet at the top center of the oil filter with the gas outlet adjacent to the top of the oil filter on a side of the outer vessel containing the oil separation media. An oil return tube exits the bottom of the oil filter or oil separator 18. The preferred oil separator has a low pressure drop between the inlet and an outlet of less than 7 psig with an oil carry over rate not to exceed 0.001 grams/hour. The outer or pressure vessel containing the oil separator or oil separator media should be rated for 400 psig or higher operating pressure. The oil separation media must be compatible with fluorocarbons, hydrofluorocarbons and hydrocarbons used as refrigerant fluids generally in the gas phase. The oil separator must oriented to prevent oil carry over or oil separated from entering the refrigerant outlet of the oil separator. The refrigerant stream from oil separator 18 is then passed via line 24 to filter/dryer 26 wherein water is extracted from the refrigerant stream.

The high pressure refrigerant stream exiting filter/dryer 26 is then passed by means of lines 30A and 30B to counter flow heat exchanger 32. The high pressure refrigerant stream is cooled in heat exchanger 32 against a returning low pressure refrigerant stream. Line 34 is used to pass the high pressure refrigerant stream exiting heat exchanger 32 to fixed orifice throttle device 36 wherein the high pressure refrigerant stream expands to form a low pressure low temperature refrigerant. The fixed orifice throttle device can be an orifice plate, a tube, a valve with a pre-set orifice, or any of the other fixed orifice devices well known in the art. Line 38 passes the low temperature, low pressure refrigerant stream to evaporator 40. Evaporator 40 permits refrigeration to be applied to cool a specific target such as detectors, moisture condensing coils, or cryo-panels. Warmed low pressure refrigerant exiting evaporator 40 passes by line 42 to heat exchanger 32 where it cools high pressure refrigerant introduced to heat exchanger 32 by means of line 30B. The low pressure refrigerant exiting heat exchanger 32 is further warmed and returned to compressor 10 by means of line 22.

As also shown in FIG. 1, the closed cycle refrigeration system of the invention can optionally and advantageously include an additional field replaceable module 44 indicated by the dotted line enclosure 45. As illustrated, the field replaceable module 44 can contain an oil filtration module 46, which functions to remove minor or trace amounts of oil from the high pressure refrigerant. In addition the field replaceable module can include a moisture filtration module 48 for the removal of minor or trace amounts of water/moisture from the high pressure refrigerant stream. As shown in FIG. 1 the high pressure refrigerant stream would be passed from oil filtration module 46 to moisture filtration module 48 by means of line 30C. While field replaceable module 44 is illustrated with the oil filtration module 46 being upstream of the moisture filtration module 48, their positions can be reversed. Depending upon the particular employment of the overall closed cycle refrigeration system, the field replaceable module 44 can include only one of the filtration modules 46 and 48.

Thus in one aspect the present invention provides an improved closed cycle refrigeration system having enhanced efficiency, especially when used with mixed component refrigerant compositions disclosed below.

The closed cycle refrigeration system of the invention is capable of producing temperatures in the range of from about 70° K to about 230° K. Such a system comprises an oil lubricated compressor to produce high pressure, high temperature refrigerant which is reduced in temperature by removal of the heat of comparison in an after cooler placed immediately down stream of the compressor. The system also contains an oil separator downstream of the after-cooler to remove oil from the refrigerant to produce a refrigerant containing less than 1% by weight of lubricating oil and a filter/dryer to remove water from the refrigerant. A heat exchanger further cools the high pressure refrigerant stream by heat exchanger with a low pressure, refrigerant return stream. The high pressure refrigerant is then expanded to reduce the pressure and the temperature of the refrigerant to produce a low pressure, cold refrigerant stream. A heat transfer device such as an evaporator is provided in which the low pressure cold refrigerant removes heat from an interface to be cooled resulting in a warmed low pressure, refrigerant return stream. The warmed low pressure refrigerant return stream passes through the heat exchanger and after further warming is returned to the low pressure inlet of the oil lubricated compressor. In one aspect the invention comprises using a fixed orifice as the throttling device in which the opening for the high pressure refrigerant stream does not change in size with the change of operating temperature and is designed to provide during cooldown from normal ambient temperature more than 60% of the maximum refrigeration capacity available during desired steady state operation of the system below 230° K.

Refrigerant exiting the oil separator will preferably have an oil content lower than the 1% mentioned above. Typically the oil content will be about 0.9% by weight or even 0.8% by weight and it is not unusual for the oil content to be less than about 0.6% by weight and some times less than about 0.4% by weight. Preferably, the oil content in the refrigerant will be less than about 0.2% by weight and even as low as 0.01% by weight. Total elimination of lubricating oil from the refrigerant would be ideal and additional removable/replaceable oil filters can also be employed in accordance with this invention. The lower the lubricating oil content in the high pressure refrigerant stream the better will be the reliability of the system and the better the heat transfer in the evaporator. Excessive oil in the refrigerant stream (greater than 1%) can create a coating on the heat transfer surfaces and reduce efficiency of the heat transfer. Excessive oil can also create a highly viscous oil residue collection in the coldest regions of the system creating an undesired restriction or choke the flow of refrigerant. This can seriously degrade reliability of the system.

While most oil lubricated compressors are operable in the system of this invention, it has been found desirable to use an oil lubricated compressor of the reciprocating, scroll or rotary type. Further, the inlet or low pressure side of the compressor should generally operate in the range of from about 0.05 Mpa to about 0.65 Mpa, while the outlet or high pressure side of the compressor should generally operate in the range of from about 1.4 Mpa to about 2.5 Mpa. The pressure on the low pressure side is preferably at least about 0.15 Mpa and preferably no higher than about 0.5 Mpa. The pressure on the high pressure side is preferably at least about 1.6 Mpa and is preferably no higher than about 2.2 Mpa.

The throttle device can be any of the types well known in the art, including, for example, a fixed size orifice plate, capillary tubing, or a needle valve having a fixed setting. Thus, for example, when operating with capillary tubing, generally a capillary having an inside diameter (ID) at least about 0.03 inch is acceptable. Inner diameters of as great as about 0.09 inch are also satisfactory. Preferably, the capillary has an ID of at least about 0.032 inch, with an ID greater than about 0.036 inch being desirable. The ID of the capillary can also be less than about 0.09 inch, such as for example less than about 0.064 inch and even less than about 0.045 inch. The length of the capillary tube can be from about 30 inches to about 180 inches. Preferably the length of the capillary tube is at least about 60 inches, with a length of at least about 120 inches being acceptable. The length of the capillary tube can less than about 150 inches and even less than about 126 inches.

Similarly, when using a fixed size orifice plate, the diameter of the orifice opening should be at least about 0.016 inch, and need not be greater than 0.09 inch. Preferably, the orifice has a diameter of at least about 0.022 inch. A diameter greater than about 0.027 inch is desirable.

It will be noted that the minimum diameters of the orifice plates in accordance with this invention are somewhat smaller than the minimum inside diameters of the capillary tubes. This is due to the fact that the flow of refrigerant through the capillary tube can be controlled or limited to a greater extent than the flow of refrigerant through an opening in an orifice plate because of the combination of inside diameter and length of the capillary tube, as distinguished from a simple opening in a plate.

It has been found that the use of capillary tubes having an inner diameter below about 0.029 inch or fixed orifice plates having an orifice diameter below about 0.015 inch results in a system which is sensitive to several system parameters, such as moisture content and oil carryover in the refrigerant flow, and viscosity of the refrigerant flow at low temperature. In this case an unusually high degree of control of the system during operation and high degree of control of manufacturing of the system components must be effected. It has also been found that the use of throttle devices having opening diameters in the range of from about 0.003 inch to about 0.015 inch results in the production of refrigeration below about 60% of the maximum steady state capacity during cooldown and a system that is susceptible to contamination and clogging.

When utilizing a needle valve in this invention, the valve must be set to provide a back-pressure of from about one atmosphere up to about five atmospheres on the inlet side of the valve. Preferably, the valve is set to provide a back-pressure of at least about 1.5 atmospheres. A back-pressures of 4.5 atmospheres (e.g. 4 atmospheres) or less will also provide quite satisfactory results.

It is also possible and desirable to include a replaceable oil filtration module, an additional replaceable moisture filtration module or both replaceable oil filtration and moisture filtration modules. Although either or both of the filtration modules can be located anywhere in the system downstream of the compressor 10, it is preferred that both of the filtration modules be located downstream of the filter dryer 26 and upstream of the heat exchanger 32.

It has also been found that the use of a particular type of a multiple component refrigerant or mixed component refrigerant results in a further improvement in the operation of the system. The mixed component refrigerant comprises at least two separate components each of which can be selected from one of the groups consisting of inert atmospheric gases, normally gaseous or liquid fluorocarbons, normally gaseous or liquid hydrofluorocarbons; and normally gaseous or gaseous hydrocarbons. Preferably, this type mixed component refrigerant will not contain more than about seven components.

By the term "inert atmospheric gases" is meant gases obtainable from or contained in the normal atmosphere and which do not normally react with other material. Illustrative of such gases are helium, neon, nitrogen, argon, and krypton. Specifically excluded from this group is oxygen.

According to the invention the fluorocarbons should contain from 1 to about 5 carbon atoms, hydrofluorocarbons contain from 1 to about 4 carbon atoms, and hydrocarbons contain from 1 to about 5 carbon atoms.

The multiple component refrigerant of this invention contains at least two components each selected from one of the groups identified above. The multiple component refrigerant can have several components and even more than one component from each group. Although it is not necessary, and at times it is not desirable, to have components from all groups present, the particular selection of components is dictated by the lowest refrigerant temperature desired. It is usually preferred that inert atmospheric gases, if present, be present in an amount of up to about 60 mol %; the fluorocarbons, if present, be present in an amount of up to about 55 mol %; the hydrofluorocarbons, if present, be present in an amount of up to about 55 mol %, and the hydrocarbons, if present, be present in an amount up to about 50 mol %. It should also be noted that the presence of hydrocarbons makes it possible for the mixed component refrigerant to be flammable. It is also possible to select the amount and proportion to the other components such that the mixed component refrigerant is non-flammable.

A non-flammable mixed component refrigerant in accordance with this invention preferably comprises a mixture containing at least one component but no more than three components selected from the groups consisting of inert atmospheric gases, at least one component but no more than three components selected from the group consisting of fluorocarbons, and at least one component but no more than three components selected from the group consisting of hydrofluorocarbons. A non-flammable mixed component refrigerant can also contain hydrocarbons so long as the hydrocarbon is present in an amount will result in the mixed component refrigerant being classified as non-flammable.

While the term hydrofluorocarbon includes hydrochlorofluorocarbons and such materials are operative in this invention, it is preferred not to use such compounds due to environmental concerns. Most preferably the mixed component refrigerants of the invention are non-toxic, non-flammable, non-ozone-depleting or low-ozone depleting containing components from atmospheric gases, fluorocarbons and hydrofluorocarbons.

In preparing mixed component refrigerants in accordance with this invention, the components are selected such that any two components will have normal boiling points differing from each other by at least about 1° K. Additionally, temperature difference in normal boiling points of any component and the next higher boiling point component in the mixed component refrigerant is no more than about 100° K. Furthermore, components in mixed component refrigerant fluid are selected such that the highest and the lowest normal boiling points of the two highest and lowest boiling components will differ from each other by at least 30° K. The components of the mixed component refrigerant are also selected such that all components will have melting (triple) point temperature of below 270° K.

Illustrative of compositions for non-flammable useful in achieving cryogenic and semi-cryogenic temperatures are the following:

TABLE 1

| Components | Concentration Range-mol % |
|---|---|
| Helium | 0–20% |
| Neon | 0–20% |
| Nitrogen | 5–60% |
| Argon | 0–50% |
| CF4 (R-14) | 10–55% |
| C2F6 (R-116) | 0–35% |
| CHF3 (R-23) | 0–35% |
| C3F8 (R-218) | 5–35% |

TABLE 2

| Components | Concentration Range-mol % |
|---|---|
| Helium | 0–10% |
| Neon | 0–10% |
| Nitrogen | 0–40% |
| Argon | 5–40% |
| CF4 (R-14) | 0–35% |
| CHF3 (R-23) | 5–55% |
| C3F8 (R-218) | 0–35% |
| C2HF5 (R-125) | 5–55% |
| C2H2F4 (R-134a) | 0–50% |

TABLE 3

| Components | Concentration Range-mol % |
|---|---|
| Nitrogen | 0–40% |
| Argon | 5–40% |
| CF4 (R-14) | 0–35% |
| CHF3 (R-23) | 5–55% |
| C3F8 (R-218) | 0–35% |
| C2HF5 (R-125) | 5–55% |
| C2H2F4 (R-134a) | 5–55% |
| C3H2F6 (R-236fa) | 0–35% |

It will be understood that it is always possible to substitute one component for another equivalent component in the mixtures used herein. For example R-125, R-32, R-218, R-134a, and R-152a can be substituted for each other depending on the performance requirements. Similarly, argon and nitrogen can be substituted for each other depending on the refrigeration temperature desired.

This aspect of the present invention is particularly advantageous for efficiently and quickly reaching temperatures in semi-cryogenic (230° K to 120° K) and cryogenic (below 120° K) ranges.

Generally, the prior art does not provide any guidance to the practitioner on how to design or to select a fixed orifice for use in a closed cycle refrigeration system using a multi-component refrigerant in order to provide highly efficient refrigeration performance when starting from ambient temperature.

Typically, in a closed cycle refrigeration system performance at steady state refrigeration conditions is used as the criteria in selecting the size of a fixed orifice. While this may provide desired temperature and refrigeration at the minimum temperature point, it does not make the cooldown from ambient temperature efficient or rapid.

The refrigeration capacity during cooldown is affected by both the design of the fixed orifice and the mixed component refrigerant composition. The proper fixed orifice design will achieve greater than about 60% of maximum refrigeration of the system during cool-down capacity provides several benefits. The system can operate with higher mass flow rates at the beginning of the cooldown.

Using a selected mixed component refrigerant in combination with a proper orifice design results in higher refrigeration capacity and faster cooldown from ambient temperature while still achieving the desired minimum temperature and refrigeration capacity at steady state.

Figure 2:
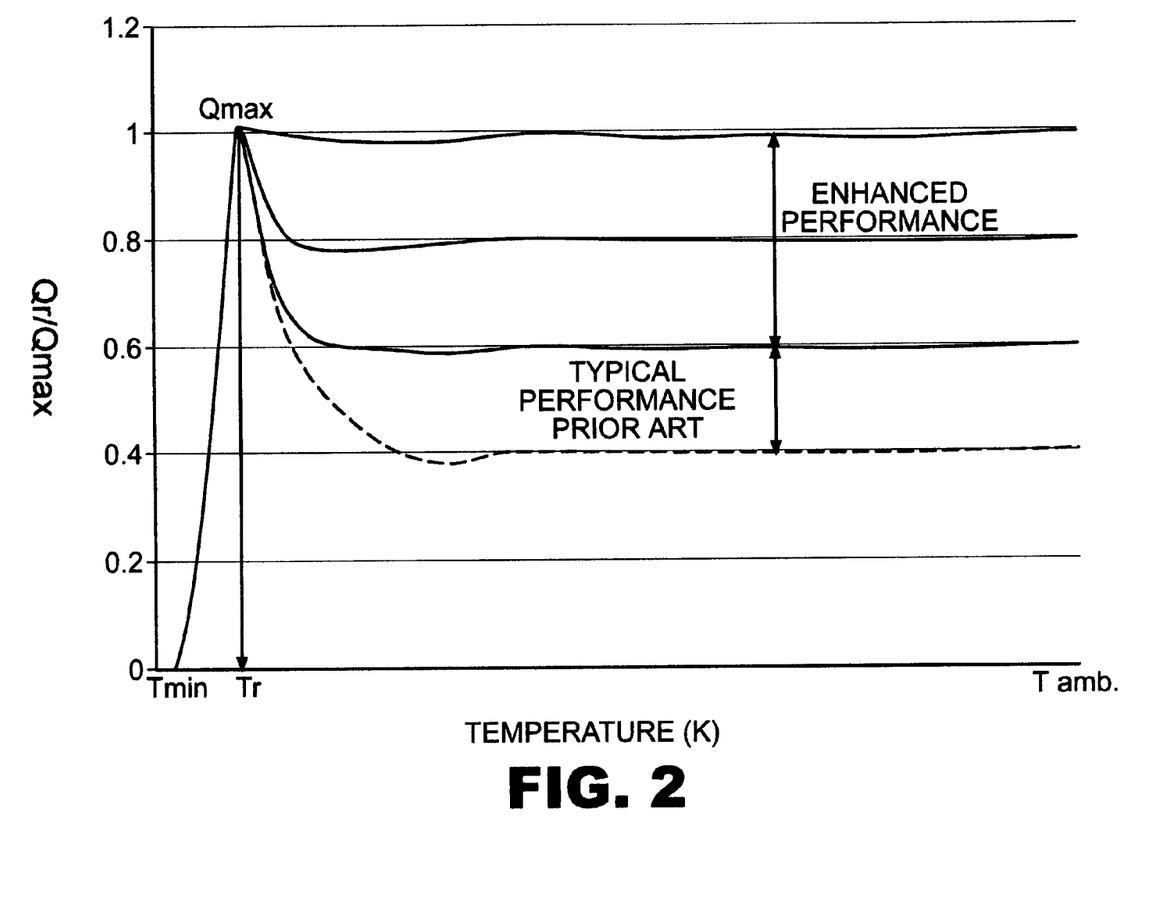
FIG. 2 is a graph representing the advantage of the present invention compared to the prior art.

Referring to FIG. 2 the dashed line is a plot of refrigeration capacity against temperature of a typical commercial closed cycle system which produces refrigeration of less than 60% and usually about 40%—of the steady state refrigeration capacity during cooldown. According to one aspect of the present invention by selecting the proper design of the fixed orifice, the refrigeration capacity during cooldown is increased to between 60% and 100% of the steady state capacity. This results in a significant improvement over prior art systems, as illustrated by the three solid line plots of FIG. 2.

Similar results have only been achieved in the prior art by using a variable throttle valve, which, increases the complexity of the system, makes it more expensive and reduces system reliability.

Thus according to the present invention in a first aspect the system is arranged so that the after cooler is immediately downstream of the compressor followed by the oil separator. The oil separator being such that there is less than 1% oil carry over at the exit end of the oil separator in the high pressure refrigerant stream. The arrangement of the compressor and the after cooler and oil separator is combined with the selection of a fixed orifice which is based upon the constraints of the system namely the size of the compressor pressure drops through the system, type of heat exchanger and the like as well as the actual composition of the refrigerant selected.

Figure 3:
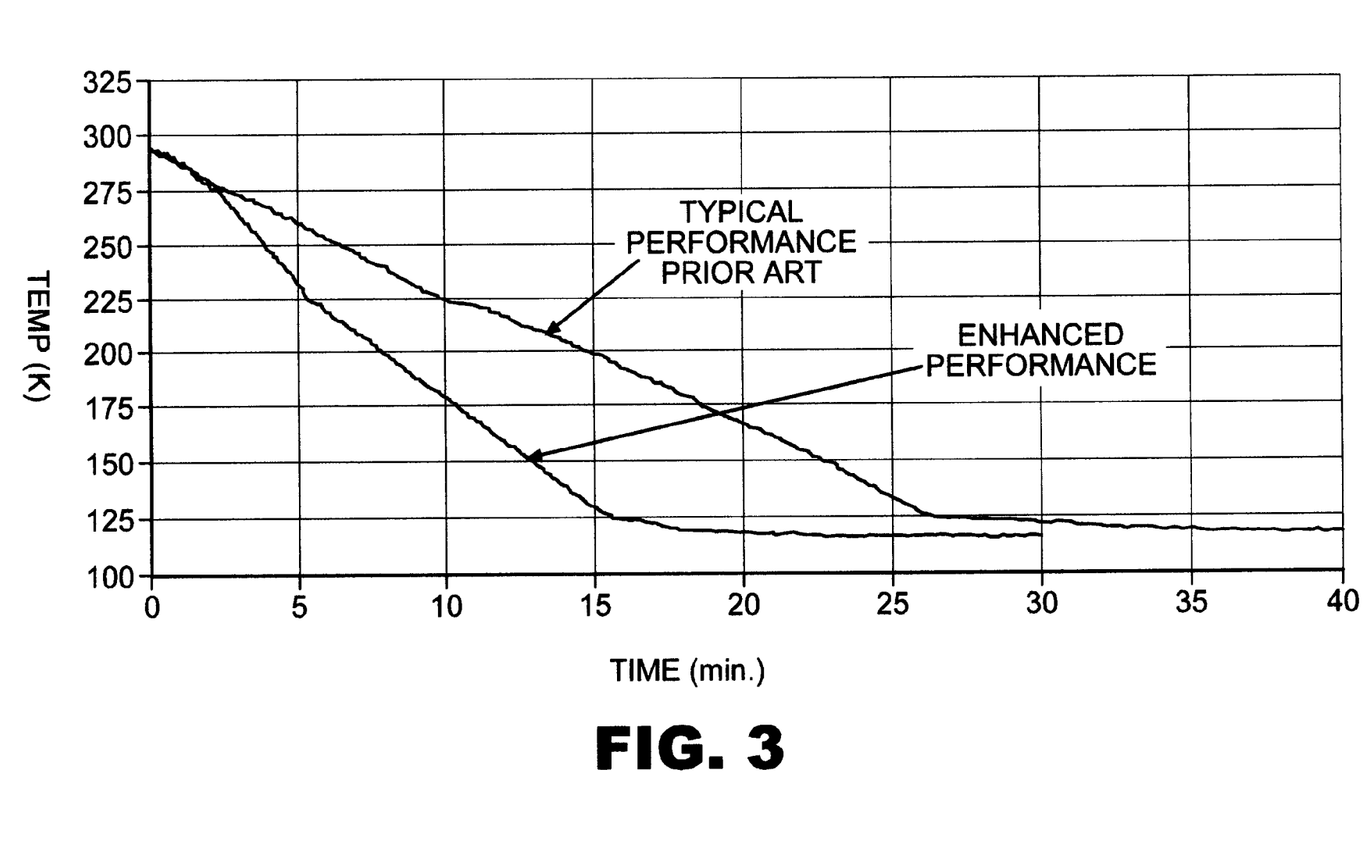
FIG. 3 is a plot of temperature against time illustrating cooldown performance of a system according to the present invention.

Referring to FIG. 3 there is a plot of temperature against time showing the cool down performance improvement according to the present invention. As shown in FIG. 3 when the invention is put into practice and the system is designed such that at least 60% of the maximum refrigeration capacity is achieved during cool down then the lowest temperatures desired can be achieved with enhanced cool down time.

According to the present invention the design and selection of the orifice is based upon the system being used, e.g. physical apparatus, and the composition of the refrigerant. With these two items a user of the present invention can then select the fixed orifice to achieve a level of 60% or greater refrigeration during cool down, thus putting the present invention into practice.

With the present invention a wide variety of refrigerant compositions can be employed to achieve the effects desired by controlling the fixed orifice size to again realize 60% of the maximum refrigeration capacity during cool down of the system to the working temperature.

Thus, in another aspect the present invention teaches a method for improving a conventional closed cycle refrigeration system by reversing the position of the after cooler and the oil filter and making sure that the oil filter removes residual oil to a level of less than 1% carry over into the high pressure refrigerant stream prior to entering a heat exchanger or a cooling device containing a heat exchanger such as a Joule-Thompson cryostat. Using a prior art system, thus modified, together with a refrigerant composition according to the present invention permits the user to improve the overall efficiency of the system by the methods described above of configuring the equipment in a particular arrangement plus using a fixed orifice which is sized depending upon the system used and the refrigerant. According to the present invention the system can be fine tuned in an iterative process once all of the parameters are known.

EXAMPLES

The following examples are illustrative of the operation and advantages of the present invention.

Example I

In this Example a mixed component refrigerant of Table 4 would be employed in a closed cycle system of this invention utilizing a fixed sized capillary tube as the throttling device. The capillary tube would have an inside diameter of 0.030 inch and a length of 90 inches. The system thus designed would provide a refrigeration capacity during cooldown of about 65% of the maximum steady state refrigeration capacity when employing the specific mixed component refrigerant.

TABLE 4

| Component | Mol. Wt. | Boil. Pt., ° K. | Melting (triple) Pt., ° K | Conc. mol % |
|---|---|---|---|---|
| Neon | 20.18 | 27.2 | 26.9 | 15 |
| Nitrogen ($N_2$) | 28.02 | 77.3 | 63.2 | 35 |
| $CF_4$ (R-14) | 88 | 145.2 | 89.3 | 35 |
| $C_3F_8$ (R-218) | 188.02 | 236.5 | 125.5 | 15 |

During operation of the system, more rapid cooldown from ambient temperature to the desired operating temperature in the cryogenic range below about 120° K would be achieved. This results in higher refrigeration capacity at steady state conditions.

Repeating this run using a capillary tube having an inside diameter of 0.016 inch and a length of 30 inches would provide a refrigeration capacity during cooldown of about 40% of the maximum steady state refrigeration capacity when employing the specific mixed component refrigerant of Table 4. During operation of this system to achieve a temperature below about 120° K there would be a substantially lower efficiency in the overall operation of the system indicated by slower cooldown time for the system and lower refrigeration capacity at steady state conditions.

Example II

Selecting another mixed component refrigerant such as described in Table 5 for the system of invention utilizing a fixed size orifice plate having an inside diameter of 0.032 inches as the throttling device would provide a refrigeration capacity during cooldown of about 75% of the maximum steady state refrigeration capacity when employing the (mixed component refrigerant) of Table 5.

TABLE 5

| Component | Mol. Wt. | Boil. Pt., °K. | Melting (triple) Pt., °K | Conc. mol % |
|---|---|---|---|---|
| Helium | 4 | 4.2 | 3.6 | 10 |
| Nitrogen ($N_2$) | 28.02 | 77.3 | 63.2 | 30 |
| Argon | 39.94 | 87.2 | 83.8 | 5 |
| $CF_4$ (R-14) | 87.97 | 145.2 | 89.3 | 30 |
| $CHF_3$ (R-23) | 70.01 | 191 | 118 | 10 |
| $C_3F_8$ (R-218) | 188.02 | 236.5 | 125.5 | 15 |

The throttle device was selected to achieve greater than about 75% of the steady state refrigeration capacity during cooldown from ambient temperature. During operation of the system, more rapid cooldown from ambient temperature to the desired operating temperature below about 100° K is achieved. This results in a greater efficiency in the overall operation of the system.

This run if repeated using a fixed size orifice plate having a diameter of 0.015 inch would provide a refrigeration capacity during cooldown of about 55% of the maximum steady state refrigeration capacity when employing the mixed component refrigerant of Table 5. During operation of the system to achieve a temperature below about 100° K there would be a substantially lower efficiency in the overall operation of the system as indicated by a significantly slower cooldown time from ambient temperature.

Example III

Another mixed component refrigerant described in Table 6 was employed in the system of this invention utilizing a fixed sized capillary tube as the throttling device. The particular capillary tube had an inside diameter of 0.038 inch and a length of 120 inches. The composition set forth in Table 6 is particularly useful in achieving temperatures from about 200° K to about 120° K.

TABLE 6

| Component | Mol. Wt. | Boil. Pt., °K. | Melting (triple) Pt., °K | Conc. mol % |
|---|---|---|---|---|
| Argon | 39.94 | 87.2 | 83.8 | 30 |
| $CF_4$ (R-14) | 87.97 | 145.2 | 89.3 | 30 |
| $CHF_3$ (R-23) | 70.01 | 191 | 118 | 10 |
| $C_2HF_5$ (R-125) | 120.02 | 225 | 170 | 30 |

The throttle device was selected to achieve greater than about 80% of the steady state refrigeration capacity during cooldown from ambient temperature. During operation of the system, more rapid cooldown from ambient temperature to the desired operating temperature below about 180° K was achieved. This results in a greater efficiency in the overall operation of the system.

This run was repeated using a capillary tube having an inside diameter of 0.020 inch and a length of 120 inches. This apparatus was selected to provide a refrigeration capacity during cooldown of about 55% of the maximum steady state refrigeration capacity when employing the mixed component refrigerant of Table 6. During operation of the system to achieve a temperature between about 200°–120° K there was a substantially lower efficiency in the overall operation of the system as indicated by slower cooldown of the system and lower refrigeration capacity at steady state conditions.

Example IV

Selecting a mixed component refrigerant such as described in Table 7, if employed in the system of this invention utilizing a fixed sized capillary tube as the throttling device, the capillary tube having an inside diameter of 0.042 inch and a length of 144 inches, would be particularly useful in achieving temperatures in the range of from about 200° K to about 120° K.

TABLE 7

| Component | Mol. Wt. | Boil. Pt., °K. | Melting (triple) Pt., °K | Conc. mol % |
|---|---|---|---|---|
| Argon | 39.94 | 87.2 | 83.8 | 25 |
| $CF_4$ (R-14) | 97.97 | 145.2 | 89.3 | 25 |
| $CHF_3$ (R-23) | 70.01 | 191 | 118 | 10 |
| $C_2HF_5$ (R-125) | 120.02 | 225 | 170 | 20 |
| $C_2H_2F_4$ (R-134a) | 102.03 | 247 | 170 | 20 |

The throttle device would be set to achieve greater than about 85% of the steady state refrigeration capacity during cooldown from ambient temperature. During operation of the system, more rapid cooldown from ambient temperature to the desired operating temperature below about 160° K would be achieved. This results in a greater efficiency in the overall operation of the system.

This run if repeated using a capillary tube having an inside diameter of 0.024 inch and a length of 120 inches would provide a refrigeration capacity during cooldown of about 55% of the maximum steady state refrigeration capacity when employing the mixed component refrigerant of Table 7. During operation of the system to achieve a temperature between about 200–120° K there would be a substantially lower efficiency in the overall operation of the system as indicated by slower cool-down of the system and lower refrigeration capacity at steady state conditions.

Example V

Selecting a mixed component refrigerant as described in Table 8 for use in the system of the invention utilizing a fixed sized capillary tube as the throttling device, with the capillary tube having an inside diameter of 0.045 inch and a length of 150 inches would be particularly useful in achieving temperatures in the range of from about 200° K to about 120° K.

TABLE 8

| Component | Mol. Wt. | Boil. Pt., °K. | Melting (triple) Pt., °K | Conc. mol % |
|---|---|---|---|---|
| Argon | 39.94 | 87.2 | 83.8 | 25 |
| $CF_4$ (R-14) | 87.97 | 145.2 | 89.3 | 25 |

TABLE 8-continued

| Component | Mol. Wt. | Boil. Pt., °K. | Melting (triple) Pt., °K | Conc. mol % |
|---|---|---|---|---|
| $CHF_3$ (R-23) | 70.01 | 191 | 118 | 10 |
| $C_2HF_5$ (R-125) | 120.02 | 225 | 170 | 20 |
| $C_3H_2F_6$ (R-236fa) | 152.04 | 271.75 | 179.5 | 20 |

The throttle device would be set to achieve greater than about 90% of the steady state refrigeration capacity during cooldown from ambient temperature. During operation of the system, more rapid cooldown from ambient temperature to the desired operating temperature below about 140° K would be achieved. This results in a greater efficiency in the overall operation of the system.

This run if repeated using a capillary tube having an inside diameter of 0.026 inch and a length of 144 inches would provide a refrigeration capacity during cooldown of about 55% of the maximum steady state refrigeration capacity when employing the mixed component refrigerant of Table 8. During operation of this system to achieve a temperature between about 200–120° K there was a substantially lower efficiency in the overall operation of the system as indicated by slower cooldown of the system and lower refrigeration capacity at steady state conditions.

Example VI

Another mixed component refrigerant described in Table 9 containing a flammable component, but blended with non-flammable components to provide a non-flammable mixture, was employed in the system of this invention. Utilizing the method specified in ISO 10156:1990, section 4, the mixture described in Table 9 was non-flammable. For this Example the system utilized a fixed sized capillary tube as the throttling device. The particular capillary tube had an inside diameter of 0.035 inch and a length of 100 inches. The mixed component refrigerant of Table 9 is particularly useful in achieving temperatures in the range of from about 120° K to about 70° K.

TABLE 9

| Component | Mol. Wt. | Boil. Pt., °K. | Melting (triple) Pt., °K | Conc. mol % |
|---|---|---|---|---|
| Neon | 20.18 | 27.2 | 24.6 | 15 |
| Nitrogen | 28.02 | 77.3 | 63.2 | 35 |
| Methane | 16.04 | 111 | 90.7 | 10 |
| $CF_4$ (R-14) | 87.97 | 145.2 | 89.3 | 25 |
| $C_3F_8$ (R-218) | 188.02 | 236.5 | 125.5 | 15 |

The throttle device was set to achieve greater than about 85% of the steady state refrigeration capacity during cooldown from ambient temperature. During operation of the system, more rapid cooldown from ambient temperature to the desired operating temperature below about 120° K was achieved. This results in a greater efficiency in the overall operation of the system.

For a flammable mixed component refrigerant components in proper concentrations will be chosen depending upon their normal boiling points, latent heat, triple point and desired refrigeration temperature. Tables 10 and 11 list selected examples of mixed component refrigerant fluids concentration ranges that are considered useful in practical systems.

TABLE 10

| Components | mol % - Concentration Range |
|---|---|
| Helium | 0–20% |
| Neon | 0–20% |
| Nitrogen | 10–50% |
| Argon | 0–50% |
| Methane | 5–45% |
| Ethane | 5–35% |
| Propane | 5–50% |
| Isobutane | 0–30% |
| Pentane | 0–30% |
| Isopentane | 0–30% |

TABLE 11

| Components | mol % - Concentration Range |
|---|---|
| Nitrogen | 0–50% |
| Argon | 10–50% |
| Methane | 5–45% |
| Ethane | 5–35% |
| Propane | 5–50% |
| Isobutane | 0–30% |
| Pentane | 0–30% |
| Isopentane | 0–30% |

Example VII

A flammable mixed component refrigerant is such as described in Table 12 was employed in the system of the invention utilizing a fixed sized capillary tube as the throttling device. The particular capillary tube had an inside diameter of 0.038 inch and a length of 120 inches. The composition the mixed component refrigerant set forth in Table 12 is particularly useful in achieving temperatures below about 120° K and approaching the temperature of liquid nitrogen (about 77° K).

TABLE 12

| Component | Mol. Wt. | Boil. Pt., °K. | Melting (triple) Pt., °K | Conc. mol % |
|---|---|---|---|---|
| Neon | 20.18 | 27.2 | 24.6 | 15 |
| Nitrogen ($N_2$) | 28.02 | 77.3 | 63.2 | 30 |
| Methane | 16.04 | 111 | 90.7 | 15 |
| Ethane | 30.07 | 184 | 89.9 | 10 |
| Propane | 44.10 | 231 | 85.5 | 30 |

The throttle device was set to achieve greater than about 70% of the steady state refrigeration capacity during cooldown from ambient temperature. During operation of the system, more rapid cooldown from ambient temperature to the desired operating temperature in the cryogenic range below about 100° K. This results in a higher refrigeration capacity at steady state conditions.

This run was repeated utilizing helium instead of and in the same proportion as the neon shown in Table 12 with substantially similar results obtained.

This run was again repeated using a particular capillary tube having an inside diameter of 0.026 inch and a length of 144 inches. The apparatus was designed to provide a refrigeration capacity during cooldown of about 50% of the maximum steady state refrigeration capacity when employing the mixed component refrigerant of Table 12. During operation of the system to achieve a temperature below 100° K there was a substantially lower efficiency in the overall operation of the system as indicated by slower cooldown of the system and lower refrigeration capacity at steady state conditions.

Example VIII

Using a flammable mixed component refrigerant described in Table 13 to achieve refrigeration at cryogenic temperatures in the range of from about 125° K to about 200° K with a fixed sized capillary tube as the throttling device, the particular capillary tube had an inside diameter of 0.042 inch and a length of 132 inches, further illustrates features of the invention.

TABLE 13

| Component | Mol. Wt. | Boil. Pt., ° K. | Melting (triple) Pt., ° K. | Conc. mol % |
|---|---|---|---|---|
| Argon | 39.94 | 87.2 | 83.8 | 17 |
| Methane | 16.04 | 111 | 90.7 | 41 |
| Ethane | 30.07 | 184 | 89.9 | 21 |
| Propane | 44.10 | 231 | 85.5 | 12 |
| n-pentane | 72.15 | 309.3 | 256.6 | 9 |

The throttle device was set to achieve greater than about 80% of the steady state refrigeration capacity during cooldown from ambient temperature. During operation of the system, more rapid cooldown from ambient temperature to the desired operating temperature below about 190° K down to about 130° K was achieved. This results in a higher refrigeration capacity at steady state conditions.

This run if repeated utilizing in the same proportion first isobutane (BP=261.4° K; Triple point=113.5° K) and then isopentane (BP=301° K; Triple point=113.25° K) instead of the n-pentane shown in Table 13, substantially similar results would be obtained.

This run if repeated, using a capillary tube having an inside diameter of 0.028 inch and a length of 144 inches would be set to provide a refrigeration capacity during cooldown of about 55% of the maximum steady state refrigeration capacity when employing the mixed component refrigerant of Table 13. During operation of the system to achieve a temperature between 200–125° K there would be a substantially lower efficiency in the overall operation of the system as indicated by slower cooldown of the system and lower refrigeration capacity at steady state conditions.

Example IX

A mixed component refrigerant described in Table 14 was employed to achieve a temperature below 150° K. The system utilized a fixed sized capillary tube as the throttling device, the particular capillary tube had an inside diameter of 0.044 inch and a length of 150 inches.

TABLE 14

| Component | Mol. Wt. | Boil. Pt., ° K. | Melting (triple) Pt., ° K. | Conc. mol % |
|---|---|---|---|---|
| Argon | 39.94 | 87.2 | 83.8 | 25 |
| CF$_4$ (R-14) | 87.97 | 145.2 | 89.3 | 30 |
| CHF$_3$ (R-23) | 70.01 | 191 | 118 | 15 |
| C$_2$HF$_5$ (R-125) | 120.02 | 225 | 170 | 30 |

The throttle device was set to achieve greater than about 80% of the steady state refrigeration capacity during cooldown from ambient temperature. During operation of the system, more rapid cooldown from ambient temperature to the desired operating temperature below about 150° K was achieved, resulting in a higher refrigeration capacity at steady state conditions.

This run was repeated using a capillary tube having an inside diameter of 0.025 inch and a length of 144 inches. This apparatus was set to provide a refrigeration capacity during cooldown of about 50% of the maximum steady state refrigeration capacity when employing the mixed component refrigerant compositions of Table 14. During operation of the system to achieve a temperature below 150° K there was a substantially lower efficiency in the overall operation of the system as indicated by slower cooldown of the system and lower refrigeration capacity at steady state conditions.

It is generally preferred to use larger diameter capillary tubing of appropriate length in preference to a smaller diameter fixed orifice to achieve the same system flow rates. This is due to lower sensitivity to contamination of such capillary tubing and ease of manipulation of the flow with a capillary tube.

Example X

Using mixed component refrigerant such as described in Table 15 employed in the system of the invention utilizing a fixed position needle valve as the throttling device with the needle valve set to provide a refrigerant return pressure of about 4.9 atmosphere at steady state conditions would be particularly useful in achieving temperatures in the range of from about 180° K to about 125° K.

TABLE 15

| Component | Mol. Wt. | Boil. Pt., ° K. | Melting (triple) Pt., ° K. | Conc. mol % |
|---|---|---|---|---|
| Argon | 39.94 | 87.2 | 83.8 | 25 |
| CF$_4$ (R-14) | 87.97 | 145.2 | 89.3 | 30 |
| CHF$_3$ (R-23) | 70.01 | 191 | 118 | 15 |
| C$_2$HF$_5$ (R-125) | 120.02 | 225 | 170 | 30 |

The throttle device would be set to achieve greater than 65% of the steady state refrigeration capacity during cooldown from ambient temperature. During the operation of the system, rapid cooldown from ambient temperature to the desired operating temperature below about 180° K results in a greater efficiency in the overall operation of the system.

This run if repeated using a fixed position needle valve to achieve 0.9 atmosphere return pressure in the system during a steady state operation would provide a refrigeration capacity during cooldown of about 40% of the maximum steady state refrigeration capacity when employing the specific mixed component refrigerant of Table 15. During operation of the system to achieve a temperature between about 180–125° K there would be a substantially lower efficiency in the overall operation of the system as indicated by slower cooldown of the system and lower refrigeration capacity at steady state conditions.

Example XI

A flammable mixed component refrigerant as described in Table 16 was employed in the system of the invention utilizing a fixed position needle valve as the throttling device. The needle valve was set to provide a refrigerant return pressure of 1.2 atmosphere at steady state conditions.

The mixed component refrigerant of Table 16 is particularly useful in achieving temperatures in the cryogenic range below about 85° K and approaching the temperature below the condensation point of liquid nitrogen (about 77° K).

TABLE 16

| Component | Mol. Wt. | Boil. Pt., ° K. | Melting (triple) Pt., ° K. | Conc. mol % |
|---|---|---|---|---|
| Neon | 20.18 | 27.2 | 24.6 | 15 |
| Nitrogen ($N_2$) | 28.02 | 77.3 | 63.2 | 35 |
| Methane | 16.04 | 111 | 90.7 | 15 |
| Ethane | 30.07 | 184 | 89.9 | 15 |
| Propane | 44.10 | 231 | 85.5 | 20 |

The throttle device was set to achieve greater than about 60% of the steady state refrigeration capacity during cooldown from ambient temperature, thus achieving steady state operation in the cryogenic range below 80° K.

This run was repeated utilizing helium instead of and in the same proportion as the neon shown in Table 16 with substantially similar results.

This run was repeated using a fixed position needle valve to provide 5.2 atmosphere return pressure at steady state conditions. During operation of the system to achieve a temperature below 85° K it was discovered that a temperature below 80° K was not achieved. High return flow results in a minimum temperature of about 85° K or above.

Example XII

In this Example a comparison is made between a fixed orifice device of the prior art and the fixed orifice device of the present invention. In the operation of both devices, the mixed component refrigerant would be one meeting the requirements of this invention with the composition set forth in Table 17, below.

TABLE 17

| Component | Mol. Wt. | Boil. Pt., ° K. | Melting (triple) Pt., ° K. | Conc. mol % |
|---|---|---|---|---|
| Argon | 39.9 | 87.2 | 83.8 | 15 |
| Methane | 16 | 111 | 90.7 | 25 |
| Ethane | 30 | 184 | 89.9 | 15 |
| Propane | 44.1 | 231 | 85.5 | 35 |
| Isobutane | 58.12 | 261.4 | 113.5 | 10 |

In this Example a typical prior art system consisting of a compressor a condenser and an expansion device was used. The compressed refrigerant was cooled in a condenser, then expanded through an expansion device to produce cold refrigerant which is passed through an evaporator to provide cooling effect to the device or medium to be cooled when the warmed refrigerant returned to the compressor. The expansion device was a fixed orifice device typical of the prior art having an inside diameter of 0.022 inch with a length of 36 inches.

In this Example a second system according to invention is employed with a fixed size orifice plate as the throttling device. The particular orifice had an inside diameter of 0.040 inch with a length of 100 inches provide a refrigeration capacity during cooldown of about 75% of the maximum steady state refrigeration capacity when employing the mixed component refrigerant of Table 17.

Figure 4:
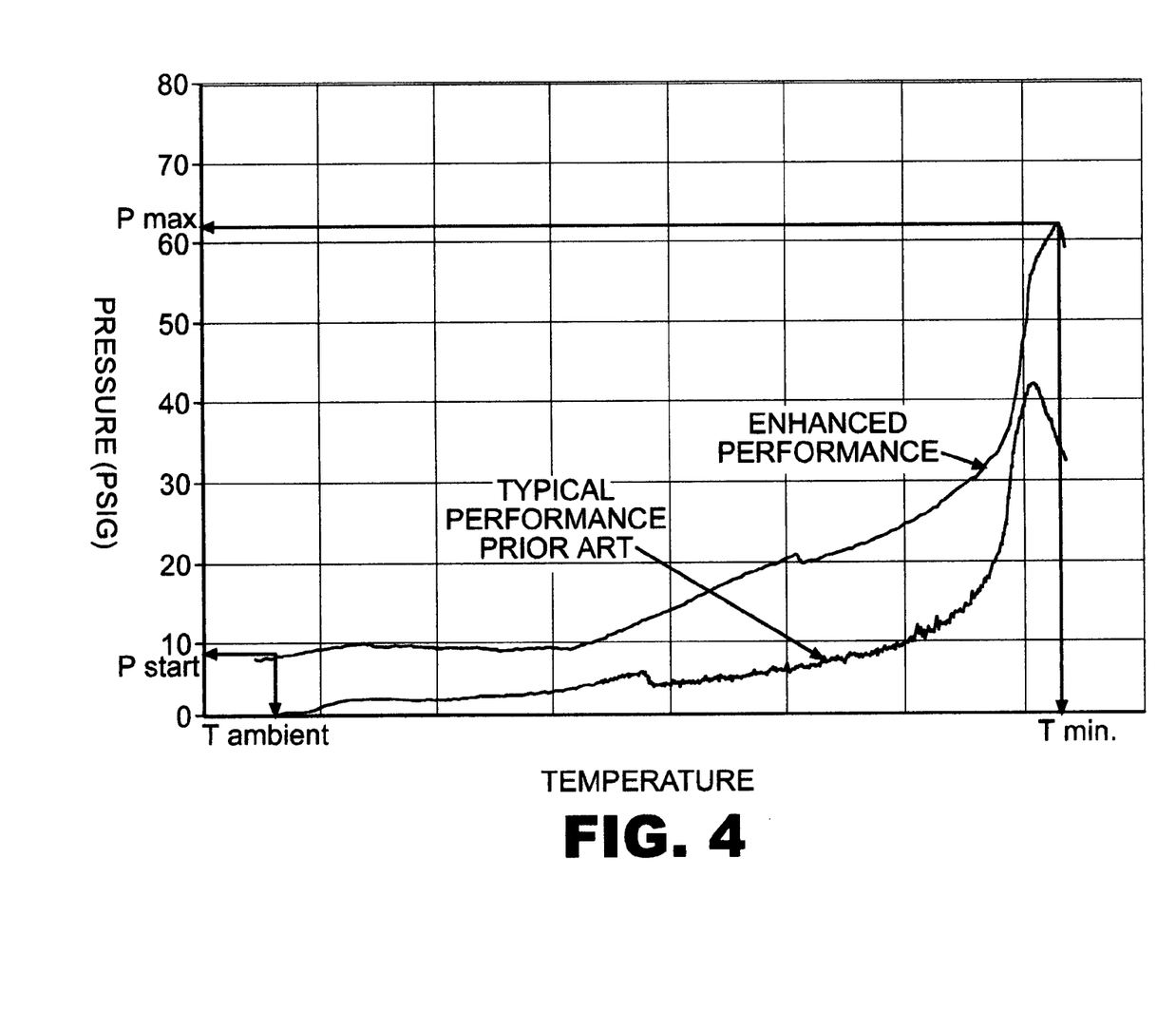
FIG. 4 is a plot of the data described in the operation of Example XII.

The pressure and temperature during operation of these two systems is illustrated in FIG. 4.

In the FIG. 4, T min. is 125° K and T ambient is about 300° K. As shown in FIG. 4, for the prior art P start is about 0.1 psig and the P max is about 40 psig. The system according to the present invention increases the P start to about 8 psig and P max reaches about 60 psig. In both cases the T min is quite close for a practical application. Further fine-tuning is achieved through slight modifications to the composition of the mixed component refrigerant.

As illustrated in FIG. 4, a typical system according to the prior art has a low flow rate and hence low return pressure in the system when the system is started at room temperature. This produces a lower refrigeration effect and hence takes longer to cooldown to the desired temperature. The pressure rises as the system gets colder and stabilizes once the system has reached steady-state operating conditions. This creates the effect of a significantly lower refrigeration capacity during the cooldown compared to the maximum refrigeration capacity available from the system at steady-state operating condition.

In the operation of a system according to the invention the fixed throttle device is designed so that at the beginning of the cooldown from room temperature the flow rate and hence the return pressure is significantly higher. This produces higher refrigeration capacity from the start and can be designed to produce a refrigeration capacity of 60% or greater compared to steady-state refrigeration capacity. The mixed refrigerant can be designed to function well with such throttle device and still provide the desired minimum refrigeration temperature. Another advantage of this feature of the system is that the system need not have excellent vacuum to keep the parasitic heat load low. It is possible to operate a system with an insulation setup that need not be a hard vacuum. This reduces system cost and makes the cooler applicable to systems that cannot provide vacuum insulation.

Low refrigeration capacity and low return pressure problems have been discussed in the paper "Modem trends in Designing Small-Scale Throttle-Cycle Coolers Operating with Mixed Refrigerants" authored by M. Boiarski and others and was presented at the Cryocooler Conference in June 2000 at Keystone, Colo. The authors have offered bi-metal valve and porous plug laminar throttle device as potential solutions to this problem as opposed to the fixed throttle devices of the present invention.

In addition to the hydroflurocarbons set out above $C_3H_3F_5$ (R245fa, R245ca), $C_3HF_7$ (R227ea), $C_2H_4F_2$ (R152a), $C_2H_3F_3$ (R143a), and $CH_2F_2$ (R32) would be suitable for use in the invention described herein.

Having thus described my invention what is desired to be secured by Letters Patent of the United States is set forth in the appended claims.

What is claimed:

1. A closed cycle refrigeration system to produce temperatures in the range of from about 70 to about 230° K comprising in combination: a refrigerant consisting of at least two components, with each component selected from any one of the groups consisting of atmospheric gases, normally gaseous and liquid fluorocarbons, normally gaseous and liquid hydrofluorocarbons, and normally gaseous and liquid hydrocarbons; an oil lubricated compressor to pressurize said refrigerant, an after cooler to receive and cool said pressure refrigerant, an oil separator to receive said refrigerant and remove oil from said refrigerant so as to produce a refrigerant containing less than 1% by weight lubricating oil in the refrigerant, a filter/dryer to receive said refrigerant from said oil separator and remove water from said refrigerant; a heat exchanger to receive said refrigerant from said filter/dryer and cool said refrigerant by heat exchange with a low pressure refrigerant return stream; a fixed orifice throttle device to receive said refrigerant stream from said heat exchanger and expand said high pressure refrigerant to produce a low pressure low temperature refrigerant stream, said throttle device so constructed and arranged to provide during cooldown of said refrigerant from normal ambient temperature more than about 60% of the maximum refrigeration capacity of said system available during desired steady state operation of said system, resulting in a low pressure low temperature refrigerant stream, means for utilizing said low pressure low temperature refrigerant stream to provide cooling and means for returning a warmed low pressure refrigerant stream to the oil lubricated compressor.

2. The closed cycle refrigeration system of claim 1 wherein the refrigerant contains a hydrocarbon present in an amount to maintain the refrigerant as non-flammable.

3. The closed cycle refrigeration system of claim 1 wherein said refrigerant is a mixture of an inert atmospheric gas, fluorocarbons containing from 1 to about 5 carbon atoms, and a hydrofluorocarbons containing from 1 to about 4 carbon.

4. A closed cycle refrigeration system according to claim 1 wherein the refrigerant is a mixture of two components selected from one of the group consisting of and normally liquid and gaseous hydrofluorocarbons.

5. A closed cycle refrigeration system according to claim 1 wherein the components of the refrigerant are selected such that the difference in normal boiling points between any component and the next higher boiling point component is no more than about 100° K.

6. A closed cycle refrigeration system according to claim 5 wherein the components of the refrigerant are selected such that the difference in normal boiling points between any two components is at least about 1° K.

7. A closed cycle refrigeration system according to claim 5 wherein the components of the refrigerant are selected such that the normal boiling points of the highest and lowest boiling components will differ from each other by about at least 30° K.

* * * * *